United States Patent
Zhu et al.

(10) Patent No.: US 11,636,849 B2
(45) Date of Patent: Apr. 25, 2023

(54) VOICE DATA PROCESSING BASED ON DEEP LEARNING

(71) Applicant: CHENGDU WANG'AN TECHNOLOGY DEVELOPMENT CO., LTD., Chengdu (CN)

(72) Inventors: Yongqiang Zhu, Chengdu (CN); Tianxiang Wang, Chengdu (CN); Xue Jiang, Chengdu (CN)

(73) Assignee: CHENGDU WANG'AN TECHNOLOGY DEVELOPMENT CO., LTD., Chengdu (CN)

( * ) Notice: Subject to any disclaimer, the term of this patent is extended or adjusted under 35 U.S.C. 154(b) by 194 days.

(21) Appl. No.: 17/207,733

(22) Filed: Mar. 21, 2021

(65) Prior Publication Data

US 2022/0238100 A1 Jul. 28, 2022

(30) Foreign Application Priority Data

Jan. 27, 2021 (CN) .......................... 202110110350.3

(51) Int. Cl.
G10L 15/14 (2006.01)
G10L 15/16 (2006.01)
G10L 15/187 (2013.01)
G10L 15/08 (2006.01)

(52) U.S. Cl.
CPC ............. *G10L 15/16* (2013.01); *G10L 15/14* (2013.01); *G10L 15/187* (2013.01); *G10L 2015/088* (2013.01)

(58) Field of Classification Search
CPC ....... G10L 15/16; G10L 15/14; G10L 15/187; G10L 2015/088; G10L 15/26; G10L 25/51; G10L 25/54; G06F 16/335; G06F 16/3343; G06F 16/355; G06F 40/216; G06F 40/279
See application file for complete search history.

(56) References Cited

U.S. PATENT DOCUMENTS

| | | | |
|---|---|---|---|
| 2015/0106091 A1* | 4/2015 | Wetjen | G10L 15/26 704/235 |
| 2017/0147576 A1* | 5/2017 | Des Jardins | G10L 15/063 |
| 2019/0304450 A1* | 10/2019 | Kwon | G10L 15/26 |
| 2020/0019564 A1* | 1/2020 | Des Jardins | G06F 16/285 |
| 2021/0117624 A1* | 4/2021 | Aghajanyan | G10L 15/1822 |
| 2022/0020361 A1* | 1/2022 | Wintrode | G10L 15/144 |

* cited by examiner

*Primary Examiner* — Abdelali Serrou

(57) ABSTRACT

Disclosed of the present application is relation to deep learning based voice data processing. The voice data to be detected is converted into target text data based on a voice recognition model so that the keyword text corresponding to the predetermined target voice keyword can be converted. Then, the data is matched with the target text data to determine whether the voice data to be detected includes the target voice keyword based on the matching result. Thus, because the voice recognition model is obtained by deep learning based on the obtained voice recognition data training set, it can obtain high-precision target text data, thereby improving the accuracy of subsequent matching. The problem of low accuracy of detecting voice data for keyword detection can therefor be solved.

15 Claims, 3 Drawing Sheets

VOICE DATA PROCESSING BASED ON DEEP LEARNING

CROSS-REFERENCE TO RELATED APPLICATIONS

This application claims priority to Chinese Patent Application No. 202110110350.3 filed on Jan. 27, 2021, the contents of which are incorporated by reference herein.

FIELD

The subject matter herein generally relates to voice processing technology, and particularly to a voice data processing method and device thereof based on deep learning.

BACKGROUND

Vocal keywords retrieval technology is an important research direction of voice recognition, which aims to quickly and accurately detect whether the voice data contains specified keywords. However, in some specific application scenarios that require high recall rates of keyword retrieval, such as detecting user-interested content or sensitive voice information from voice data, achieving high recall rates and reducing false positives as much as possible is still an important problem to be solved.

BRIEF DESCRIPTION OF THE FIGURES

Implementations of the present disclosure will now be described, by way of example only, with reference to the attached figures, wherein.

DETAILED DESCRIPTION

Figure 1:
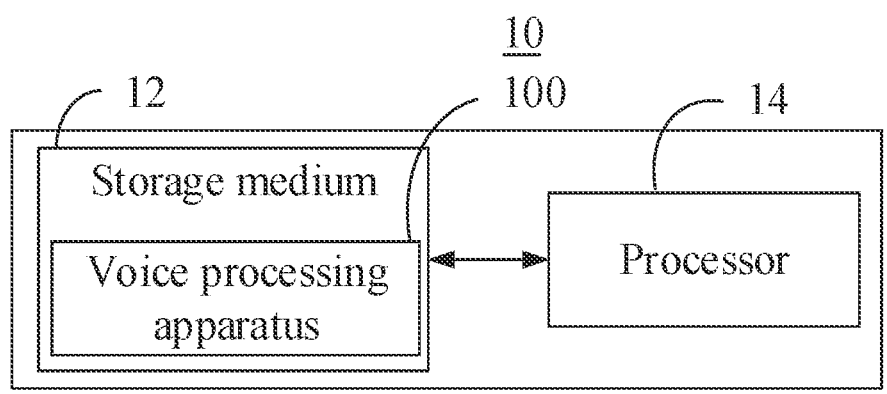
FIG. 1 illustrates a schematic diagram of an electronic device according to an embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to" it specifically indicates open-ended inclusion or membership in a so-described combination, group, series, and the like.

Referring to FIG. 1, in one embodiment of the present application, an electronic device 10 is provided, which can include a storage medium 12, a processor 14, and a deep learning based voice processing apparatus 100.

Wherein, the storage medium 12 and the processor 14 are directly or indirectly electrically connected to realize data transmission or interaction. For example, the storage medium 12 and the processor 14 can be connected to each other through one or more communication buses or signal lines. The deep learning based voice processing apparatus 100 includes at least one software function modules that can be stored in the storage medium 12 in the form of software or firmware. The processor 14 is configured to execute executable computer programs stored in the storage medium 12, for example, to execute software function modules and computer programs included in the deep learning based voice data processing apparatus 100, so as to realize the voice data processing method based on deep learning (which are described later).

Optionally, the storage medium 12 can be, but not limited to, a random access memory (RAM), a read only memory (ROM), or a programmable read-only memory (PROM), Erasable Programmable Read-Only Memory (EPROM), Electric Erasable Programmable Read-Only Memory (EEPROM), etc.

In addition, the processor 14 can be a general-purpose processor, ti including a central processing unit (CPU), a network processor (NP), a system on chip (SoC), etc. It can also be a digital signal processor (DSP), application specific integrated circuit (ASIC), field programmable gate array (FPGA) or other programmable logic device, discrete gate or transistor logic device, discrete hardware component.

It can be understood that the structure shown in FIG. 1 is only for illustration, and the electronic device 10 may also include more or fewer components than those shown in FIG. 1, or have a configuration different from that shown in FIG. 1. For example, the electronic device 10 can include a communication unit for information interaction with other devices (e.g., when the electronic device 10 is a server, the other device may be a terminal device, such as a mobile phone).

Figure 2:
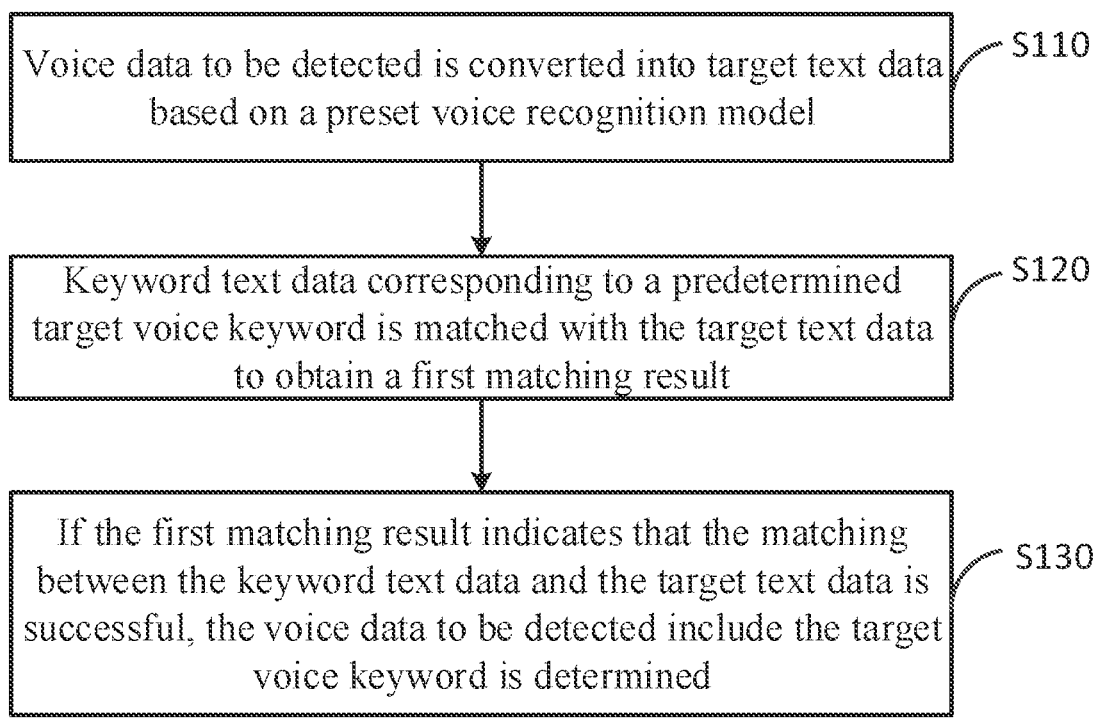
FIG. 2 illustrates a schematic flowchart of a voice data processing method according to an embodiment of the present application.

With reference to FIG. 2, an embodiment of the present application also provides a deep learning based voice data processing method that can be applied to the above-mentioned electronic device 10. Wherein, the steps of the method defined in the process related to the voice data processing method can be implemented by the electronic device 10.

The specific process shown in FIG. 2 will be described in detail below.

At block S110, voice data to be detected is converted into target text data to based on a preset voice recognition model.

In this embodiment, In this embodiment, after obtaining the voice data to be detected, the electronic device 10 may convert the voice data to be detected into the target text data based on the preset voice recognition model.

Wherein, the preset voice recognition model can be obtained by deep learning based on an obtained training set composed of a plurality of voice recognition data samples, and is configured to convert voice data into text data.

At block S120, keyword text data corresponding to a predetermined target voice keyword is matched with the target text data to obtain a first matching result.

In this embodiment, after obtaining the target text data based on block S110, the electronic device 10 may match the keyword text data corresponding to the predetermined target voice keyword with the target text data to obtain the first matching result.

Wherein, in this embodiment, the first matching result may indicate that the matching between the keyword text data and the target text data is successful or unsuccessful.

At block S130, if the first matching result indicates that the matching between the keyword text data and the target text data is successful, the voice data to be detected include the target voice keyword is determined.

In this embodiment, if the first matching result that indicates the matching between the keyword text data and the target text data is successful is obtained based on the block S120, the electronic device 10 can determine that the voice data to be detected include the target voice keyword.

Based on the above-mentioned method, since the voice recognition model is obtained by deep learning based on the obtained training set composed of a plurality of voice recognition data samples, high precision target text data can be obtained, thereby improving the accuracy of voice data matching, and thereby ti solving the problem of low accuracy of keyword detection based on the traditional voice processing technology. In this embodiment, it needs to be explained for the block S110 that the specific method for converting the voice data to be detected into the target text data can be selected according to actual application requirements.

For example, in an alternative example, the voice feature information in the voice data to be detected can be extracted first, and then the voice feature information can be input into the voice recognition model, so that the voice recognition model can process the voice data to be detected based on the voice feature information. Thus, a text string can be output from the voice recognition mode to obtain the target text data.

Wherein, the voice feature information may refer to Filter Bank feature information or MFCC (Mel Frequency Cepstral Coefficient) feature information in the voice data to be detected. The voice recognition model may be, such as GRU-CTC model, CNN-RNN-CTC model, and Deep-Speech model, and so on. The training set composed of a plurality of voice recognition data samples for training the voice recognition model may include thchs-30 (Chinese corpus of Tsinghua University), aishell (Hill Shell Chinese Mandarin Speech Database), etc.

Further, it needs to be explained for the block S120 that the specific method for matching the keyword text data with the target text data can be selected according to actual application requirements.

For example, in an alternative example, considering that the keyword text data and the target text data are character strings, therefore, the keyword text data and the target text data can be matched based on a string matching method. Wherein, the string matching method can use KMP algorithms, AC automata (Aho-Corasick automation) algorithms, or other similar algorithms.

In one embodiment, if the first matching result indicates that the matching between the keyword text data and the target text data is unsuccessful, in order to improve the detection accuracy of the target voice keyword, the following steps (1)-(13) can be implemented.

In step 1, homophone expansion is performed on the keyword text data to obtain at least one homophone text data.

In this embodiment, after obtaining the first matching result and the first matching result indicates that the matching between the keyword text data and the target text data is unsuccessful based on step S120, homophone expansion can be performed on the keyword text data, so that at least one homophone text data corresponding to the keyword text data can be obtained. For example, homophone expansion can be performed on the keyword text data based on the Chinese homophone dictionary.

In step S2, each of the homophone text data is matched with the target text data to obtain at least one second matching result.

In this embodiment, after the at least one homophone text data is obtained based on step 1, for each of the homophone text data, the homophone text data can be matched with the target text data (for specific matching methods, please refer to the previous matching method for the keyword text data at block S120), the homophone text data can be obtained. In this way, for at least one homophone text data, at least one second matching result respectively corresponding to each of the at least one homophone text data can be obtained.

Wherein, if the at least one second matching result indicates that at least one homophone text data is successfully matched with the target text data, step 3 may be performed. Otherwise, if the at least one second matching result indicates that none of the at least one homophone text data is successfully matched with the target text data, it can be determined that the voice data to be detected does not include the target voice keyword.

In step 3, the target text data is segmented into at least one segmentation text.

In this embodiment, if at least one homophone text data is successfully matched with the target text data based on step 2, the target text data can be segmented. In this way, at least one segmentation text can be obtained, that is, the target text can be segmented into at least one segmentation text.

In step 4, the segmentation text that matches the homophone text data is extracted from the at least one segmentation text, and the homophone text data included in the segmentation text is replaced with the keyword text data to obtain a target segmentation text.

In this embodiment, after the at least one segmentation text is obtained based on step 3, the homophone text data included in the segmentation text can be replaced with the keyword text data, so that the target segmentation text including the keyword text data can be obtained.

In step 5, an occurrence probability of the target segmentation text based on a preset language model is calculated.

In this embodiment, after the target segmentation text is obtained based on step 4, the occurrence probability of the target text clause data can be calculated based on a preset language model.

Wherein, the language model can be obtained by training based on the text training set in a first target corpus. In this embodiment, the occurrence probability of the target segmentation text may refer to the frequency of occurrence of the target segmentation text in the sentences of the text training set.

In addition, the first target corpus may include Wikipedia corpus, Sogou news corpus, etc. The text training set may be a part of the text or sentence after adjusting the order of the text or sentence in the first target corpus, and the other part may be used as a text test set.

In step 6, a probability interval corresponding to a text length of the target segmentation text is obtained, according to the text length of the target segmentation text and a pre-established mapping relationship between text length and probability.

In this embodiment, the mapping relationship between text length can be established based on the language model and the text test set in the first target corpus. Further, the text length may refer to the number of words included in the target segmentation text.

In step 7, whether the occurrence probability is within the probability intergyral. In this embodiment, if the occurrence probability is within the probability interval, step 8 is implemented. Otherwise, if the occurrence probability is not within the probability interval, it can be determined that the voice data to be detected does not include the target voice keyword.

In step 8, a probability that the target text data belongs to a plurality of ti preset text classifications is determined based on a preset text classification model, and a category vector of the target text data is obtained.

In this embodiment, after determining that the occurrence probability belongs to the probability interval based on step 7, the probability that the target text data belongs to a plurality of preset text categories can be determined based on a preset text classification model. Thus, the probability that the target text data belongs to each of the text categories can be obtained, so that a vector can be constructed based on the obtained multiple probabilities, and therefore the category vector of the target text data can be obtained.

Wherein, the text classification model may be obtained by training based on a text corpus classification set including the plurality of text categories in a second target corpus. In addition, the text classification model may include FastText, TextCNN, and other models, and the second target corpus may include the Fudan Chinese text classification corpus, Sogou news corpus, and the like.

In step 9, a correlation degree value between the keyword text data and each of the text categories is calculated, a correlation degree vector between the target keyword and the plurality of text categories is obtained, and a normalization processing is performed to the correlation degree vector to obtain a normalized vector of the correlation degree vector.

In this embodiment, after determining that the occurrence probability belongs to the probability interval based on step 7, the correlation degree value between the keyword text data and each of the text categories can be calculated. And then, the vector can be constructed based on the obtained multiple correlation degree values, thereby obtaining the correlation degree vector between the target keyword and the plurality of text categories. Then, the correlation degree vector is normalized to obtain the corresponding normalization vector. Wherein, the normalization processing method may be performed based on the softmax function.

In step 10, a cosine similarity between the category vector and the normalization vector is calculated, wherein the cosine similarity is determined as a category matching degree between the keyword text data and the target text data.

In this embodiment, after the category vector is obtained based on the step 8 and the normalized vector is obtained based on the step 9, the cosine similarity between the category vector and the normalized vector can be calculated. Then, the cosine similarity can be determined as the degree of match between the keyword text data and the target text data.

In step 11, a text data correlation degree between the keyword text data and the target text data is calculated based on the category matching degree and the occurrence probability.

In step 12, whether the text data correlation degree is greater than a preset degree threshold is determined.

In this embodiment, the preset degree threshold may be predetermined based on a voice keyword retrieval training performed in advance. The training to process can be the deep learning-based voice data processing method provided in the embodiments of this application to adjust the correlation threshold according to the real result and the result obtained based on the method, so that the real result and the result obtained based on the method are adjusted.

Wherein, if the text data correlation degree is greater than or equal to the preset degree threshold, step 13 may be executed. If the text data correlation degree is less than the preset degree threshold, it may be determined that the voice data to be detected does not include the target voice keywords.

In step 13, the voice data to be detected includes the target voice keyword is determined if the text data correlation degree is greater than or equal to the preset degree threshold.

Optionally, in the example mentioned above, the specific manner of calculating the correlation degree value based on step 9 can be selected according to actual application requirements. For example, in an alternative example, in order to improve the accuracy of calculating the correlation degree value, the step 9 may include sub-step 91 to sub-step 96 which are described in detail as follows.

In sub-step 91, the number of training texts included in the text corpus classification set is counted to obtain a first text number.

In this embodiment, the number of training texts included in the text corpus classification set may refer to the number of texts used to train the text classification model.

In sub-step 92, for each text category, a number of training texts that belong to the text category and include the keyword text data is determined, to obtain a second text number.

In this embodiment, for each text category, the training texts belonging to the text category and including the keyword text data can be determined from the training texts included in the text corpus classification set, and the number of the training texts can be accounted to obtain the second text number. by this way, for a ti plurality of the text categories, multiple second text numbers can be obtained.

In sub-step 93, for each text category, a number of training texts that do not belong to the text classification and include the keyword text data is determined, to obtain a third text number.

In this embodiment, for each of the text categories, based on the training texts included in the text corpus classification set, the training texts that does not belong to the text category but include the target keyword text can be determined. Thereafter, the number of the training texts can be accounted and therefore the third text number corresponding to the text category can be obtained. By this way, for multiple text categories, multiple third text numbers can be Obtained.

In sub-step 94, for each text category, a number of training texts that belong to the text category and do not include the keyword text data is determined, to obtain a fourth text number.

In this embodiment, based on the training texts included in the text corpus classification set, the training texts that belong to the text category and does not include the target keyword text can be determined. Thereafter, the number of the training texts can be accounted and therefore the fourth text number corresponding to the text category can be obtained. By this way, for multiple text categories, multiple fourth text numbers can be obtained.

In sub-step 95, for each text category, a number of training texts that does not belong to the text category and do not include the keyword text data is determined, to obtain a fifth text number.

In this embodiment, based on the training texts included in the text corpus classification set, the training texts that does not belong to the text category and does not include the target keyword text can be determined. Thereafter, the number of the training texts can be accounted and therefore the fifth text number corresponding to the text category can be obtained. By this way, for multiple text categories, multiple fifth text numbers can be obtained.

In sub-step 96, for each text category, the correlation degree value between the text category and the keyword text data is calculated based on the first text number, the second text number, the third text number, the fourth text number, and the fifth text number corresponding to the text category. In this embodiment, for multiple text categories, multiple correlation degree values can be calculated. The greater the correlation degree value is, the corresponding text category is more relevant with the keyword text data.

In this embodiment, the sub-step 96 can be implemented as follows. In the first step, a product of the second text number and the fifth text number is calculated to obtain a first product. In the second step, a product of the third text number and the fourth text number is calculated to obtain a second product. In the third step, a square of the difference between the first product and the second product is calculated to obtain a square value. In the fourth step, a product of the first text number and the square value is calculated to obtain a third Product. In the fifth step, a sum of the second text number and the fourth text number is calculated to obtain a first sum value. In the sixth step, a sum of the third text number and the fifth text number is calculated to obtain a second sum value is obtained. In the seventh step, a sum of the second text number and the third text number is calculated to obtain a third sum value. In the eighth step, a sum of the fourth text number and ti the fifth text number is calculated to obtain a fourth sum value. In the ninth step, a product of the first sum value, the second sum value, the third sum value and the fourth sum value is calculated to obtain a fourth product. In the tenth step, a quotient of the third product and the fourth product is calculated, and the quotient is determined as the correlation degree value between the text category and the keyword text data.

Optionally, the specific method for calculating the text data correlation degree between the keyword text data and the target text data in the step 11 can be implemented as follows.

First, a first weight coefficient of the category matching degree and a second weight coefficient of the occurrence probability are determined. Secondly, based on the first weight coefficient and the second weight coefficient, a weighted summation for the category matching degree and the occurrence probability is executed, to obtain the text data correlation degree between the keyword text data and the target text data.

Wherein, the sum of the first weight coefficient and the second weight coefficient is 1, and the first weight coefficient is greater than or equal to 0.2 and less than or equal to 0.8.

On the basis of the above example, it should be noted that the specific type of the language model is not limited and can be selected according to actual application requirements. For example, in an alternative example, the language model may be a neural network model, such as a neural network language model based on a recurrent neural network. In another alternative example, the language ti model may be a statistical language model, such as a trigram language model. Further, the specific method for training the statistical language model is also not limited, and it can be selected according to actual application requirements.

In one example, the statistical language model can be obtained by a training method described as follows.

First, for each text training sentence included in the text training set, a word occurrence probability of each word of the text training sentence in the text training set is calculated, and a sentence occurrence probability of the text training sentence based on the word occurrence probability of each word is calculated. Then, the statistical language model is obtained based on the correspondence between each of the text training sentences and the sentence occurrence probability corresponding to the text training sentences.

In view of above, the statistical language model can be understood as a statistical table including the occurrence probability of each of the text training sentences and the corresponding text training sentences. By this way, when the sentence occurrence probability of the target sentence needs to be determined based on the statistical language model, the sentence occurrence probability of the target sentence can be found based on the corresponding relationship in the statistical table.

In an alternative example, the occurrence probability of each word of the text training sentence in the text training set can be determined as follows.

In the first step, for each word of the text training sentence, a first number of a first target word sequence included in the text training set is accounted, a second number of a second target word sequence included in the text training set is accounted, and a third number of the word included in the text training set is accounted, wherein the first target word sequence is composed of the word and other two words before the word in the text training sentence, and the second target word sequence is composed of the word and another word before the word in the text training sentence.

In the second step, a first ratio of the first number to the second number corresponding to each word is calculated.

In the third step, a second ratio of the second number and the third number corresponding to each word is calculated.

In the fourth step, a third ratio of the third number to a number of all words of the text training set is calculated.

In the fifth step, a first smoothing coefficient of the first ratio, a second smoothing coefficient of the second ratio, and a third smoothing coefficient of the third ratio are determined, wherein a sum of the first smoothing coefficient and the second smoothing coefficient and the third smoothing coefficient is 1, and each of the first smoothing coefficient, the second smoothing coefficient, and the third smoothing coefficient is greater than or equal to 0.

In the sixth step, for each word of the text training sentence, a weighted summation is performed to the first ratio, the second ratio, and the third ratio based on the first smoothing coefficient, the second smoothing coefficient, and the third smoothing coefficient, to obtain the occurrence probability of each word of the text training sentence in the text training set.

In this embodiment, based on the above example, each word in the text training sentence can be obtained based on word segmentation processing on the text training sentence. For the first word of the sentence, spaces can be used to replace the corresponding two words before the first word.

Optionally, in the above example, the specific manner of determining the occurrence probability of the corresponding text training sentence based on the word occurrence probability of each word is not limited.

For example, in an alternative example, the occurrence probability of each word included in the text, training sentence may be accumulated and multiplied, and the obtained product may be determined as the occurrence probability of the text training sentence.

For another example, in another alternative example, in order to avoid the problem of probability underflow when determining the occurrence probability of the text training sentence, the occurrence probability of each word included in the text training sentence may be cumulatively multiplied to obtained a product, and a logarithmic operation is performed on the obtained product obtained, and then the result of the logarithmic operation is determined as the occurrence probability of the text training sentence.

On the basis of the above example, the deep learning voice data processing method further includes a step of establishing the mapping relationship between text length and probability in step 6 based on the language model and the text test set in the first target corpus, as described blow.

For example, in an alternative example, based on the language model being a statistical language model, the mapping relationship between text length and probability can be established based on the following steps.

First, based on the correspondence between each text training sentence in the statistical language model and the occurrence probability of the sentence corresponding to the text training sentence, an occurrence probability of each test sentence included in the text test set is determined.

Second, a word length of each test sentence of the text test set is determined, where the word length represents the number of test words included in the corresponding text test sentence, and the test words can be obtained based on word segmentation processing on the text test sentence.

Then, for each word length, the corresponding probability interval is determined based on the occurrence probability of each test sentence corresponding to the word length, and the corresponding relationship between the word length and the probability interval is thus established to obtain the mapping relationship between text length and probability.

For example, the text test set includes 5 test sentences, which are test sentence 1, test sentence 2, test sentence 3, test sentence 4, and test sentence 5, respectively. Among them, the word length of the test sentence 1 is A, the word length of the test sentence 2 is B, the word length of the test sentence 3 is A, the word length of the test sentence 4 is B, and the word length of the test sentence 5 is A. Based on this, for word length A, there are 3 test sentences corresponding to it. Therefore, the maximum value and minimum value of the probability of occurrence of the sentences corresponding to these 3 test sentences can respectively be regarded as the upper limit and lower limit of the corresponding probability interval. Thereafter, a corresponding relationship between the word length A and the probability interval can be established. For word length B, there are two test sentences. Therefore, the maximum value and minimum value of the occurrence probability of the sentences corresponding to these two test sentences can be regarded as the upper limit and lower limit of the corresponding probability interval, and then a corresponding relationship between the word length B and the probability interval is established. By this way, the mapping relationship between text length and probability corresponding to the word length of each word can be obtained.

Figure 3:
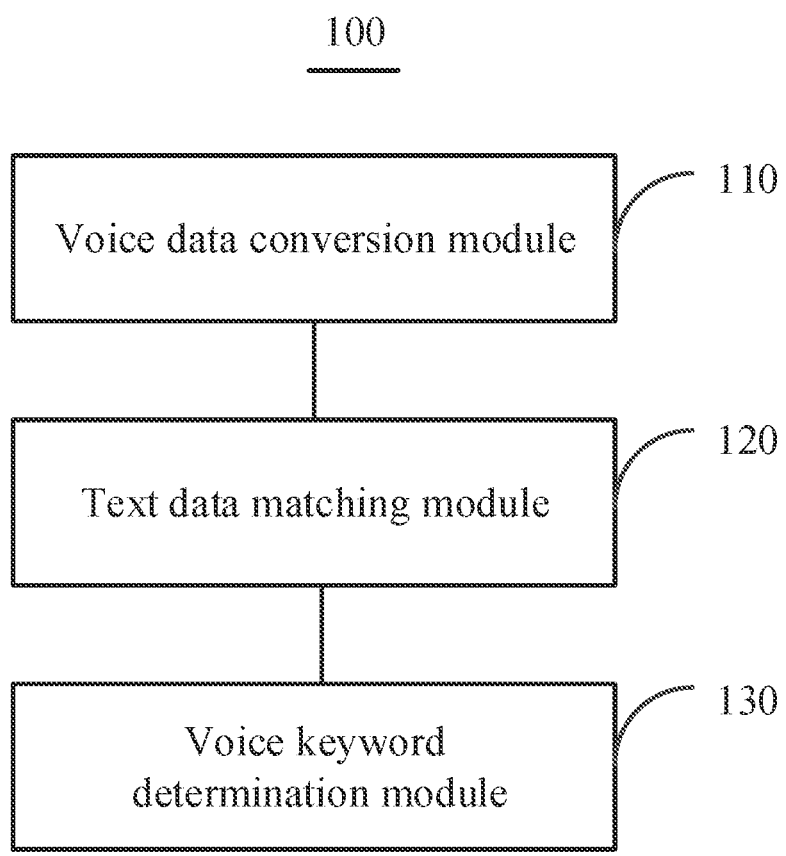
FIG. 3 illustrates a schematic diagram of a voice data processing apparatus of FIG. 1.

With reference to FIG. 3, an embodiment of the present application provides a deep learning-based voice data processing apparatus 100 that can be integrated into the above-mentioned electronic device 10.

Wherein, the voice data processing apparatus 100 may include a voice data conversion module 110, a text data matching module 120, and a voice keyword determination module 130.

The voice data conversion module 110 is configured to convert voice data to be detected into target text data based on a preset voice recognition model. It should be understood that, the voice data conversion module 110 can be configured to execute the above mentioned block S110 of FIG. 2. More details with regard to the voice data conversion module 110 can refer to the above-mentioned content related to the block S110.

The text data matching module 120 is configured to match keyword text data corresponding to a predetermined target voice keyword with the target text data to obtain a first matching result. It should be understood that, the text data matching module 120 can be configured to execute the above mentioned block S120 of FIG. 2. More details with regard to the text data matching module 120 can refer to the above-mentioned content related to the block S120.

The voice keyword determination module 130 is configured to determine whether the voice data to be detected include the target voice keyword according to the first matching result. In this embodiment, if the first matching result indicates that the matching between the keyword text data and the target text data is successful, the voice keyword determination module 130 determines that the voice data to be detected include the target voice keyword. It should be understood that, the voice keyword determination module 130 can be configured to execute the above mentioned block S130 of FIG. 2. More details with regard to the voice keyword determination module 130 can refer to the above-mentioned content related to the block S130.

In view of above, the deep learning-based voice data processing method and device provided in this application can convert the voice data to be detected into target text data based on the voice recognition model so that the keyword text corresponding to the predetermined target voice keyword can be converted. Then, the data is matched with the target text data to determine whether the voice data to be detected includes the target voice keyword based on the matching result. Thus, because the voice recognition model is obtained by deep learning based on the obtained voice recognition data training set, it can obtain high-precision target text data, thereby improving the accuracy of subsequent matching. The problem of low accuracy of detecting voice data for keyword detection can therefor be solved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. A voice data processing method based on deep learning, executed by a processor of an electronic device, comprising:
   converting voice data into target text data based on a preset voice recognition model;

matching keyword text data corresponding to a predetermined target voice keyword with the target text data to obtain a first matching result;

determining whether the voice data include the target voice keyword according to the first matching result, wherein if the first matching result indicates that the matching between the keyword text data and the target text data is successful, it is determined that the voice data include the target voice keyword;

performing homophone expansion on the keyword text data to obtain at least one homophone text data, if the first matching result indicates that the matching between the keyword text data and the target text data is unsuccessful;

matching each of the homophone text data with the target text data to obtain at least one second matching result;

segmenting the target text data into at least one segmentation text, if the at least one second matching result indicates that at least one homophone text data is successfully matched with the target text data;

extracting the segmentation text that matches the homophone text data from the at least one segmentation text, and replacing the homophone text data included in the segmentation text with the keyword text data to obtain a target segmentation text;

training a preset statistical language model by:

for each text training sentence included in the text training set, calculating a word occurrence probability of each word of the text training sentence in the text training set;

calculating a sentence occurrence probability of the text training sentence based on the word occurrence probability of each word;

obtaining the statistical language model based on the correspondence between each of the text training sentences and the sentence occurrence probability corresponding to the text training sentences;

calculating an occurrence probability of the target segmentation text based on the statistical language model, the occurrence probability of the target segmentation text referring to a frequency of occurrence of the target segmentation text in sentences of a text training set in a first target corpus for training the preset language model;

obtaining a probability interval corresponding to a text length of the target segmentation text, according to the text length of the target segmentation text and a pre-established mapping relationship between text length and probability;

determining whether the occurrence probability is within the probability interval;

determining a probability that the target text data belongs to a plurality of preset text classifications based on a preset text classification model, and obtaining a category vector of the target text data, if the occurrence probability is within the probability interval, wherein the text classification model is obtained by training based on a text corpus classification set including a plurality of text categories in a second target corpus;

calculating a correlation degree value between the keyword text data and each of the text categories, to obtain a correlation degree vector between the target keyword and the plurality of text categories;

performing a normalization processing to the correlation degree vector to obtain a normalized vector of the correlation degree vector;

calculating a cosine similarity between the category vector and the normalization vector, wherein the cosine similarity is determined as a category matching degree between the keyword text data and the target text data;

calculating a text data correlation degree between the keyword text data and the target text data based on the category matching degree and the occurrence probability; and determining whether the voice data includes the target voice keyword by determining whether the text data correlation degree is greater than a preset degree threshold, wherein the voice data includes the target voice keyword is determined if the text data correlation degree is greater than or equal to the preset degree threshold.

2. The method of claim 1, wherein a method of calculating a correlation degree value between the keyword text data and each of the text categories, comprises:

counting a number of training texts included in the text corpus classification set to obtain a first text number;

for each text category, determining a number of training texts that belong to the text category and include the keyword text data, to obtain a second text number;

for each text category, determining a number of training texts that do not belong to the text classification and include the keyword text data, to obtain a third text number;

for each text category, determining a number of training texts that belong to the text category and do not include the keyword text data, to obtain a fourth text number;

for each text category, determining a number of training texts that does not belong to the text category and do not include the keyword text data, to obtain a fifth text number;

for each text category, calculating the correlation degree value between the text category and the keyword text data based on the first text number, the second text number, the third text number, the fourth text number, and the fifth text number corresponding to the text category.

3. The method of claim 2, wherein a method of calculating the correlation degree value between the text category and the keyword text data based on the first text number, the second text number, the third text number, the fourth text number, and the fifth text number corresponding to the text category, comprises:

calculating a product of the second text number and the fifth text number to obtain a first product;

calculating a product of the third text number and the fourth text number to obtain a second product;

calculating a square of the difference between the first product and the second product to obtain a square value;

calculating a product of the first text number and the square value to obtain a third Product;

calculating a sum of the second text number and the fourth text number to obtain a first sum value;

calculating a sum of the third text number and the fifth text number to obtain a second sum value;

calculating a sum of the second text number and the third text number to obtain a third sum value;

calculating a sum of the fourth text number and the fifth text number to obtain a fourth sum value;

calculating a product of the first sum value, the second sum value, the third sum value and the fourth sum value to obtain a fourth product;

calculating a quotient of the third product and the fourth product, wherein the quotient is determined as the correlation degree value between the text category and the keyword text data.

4. The method of claim 1, wherein a method of calculating a text data correlation degree between the keyword text data and the target text data based on the category matching degree and the occurrence probability, comprises:
determining a first weight coefficient of the category matching degree and a second weight coefficient of the occurrence probability;
executing a weighted summation for the category matching degree and the occurrence probability based on the first weight coefficient and the second weight coefficient, to obtain the text data correlation degree between the keyword text data and the target text data;
wherein the sum of the first weight coefficient and the second weight coefficient is 1, and the first weight coefficient is greater than or equal to 0.2 and less than or equal to 0.8.

5. The method of claim 1, wherein a method of calculating a word occurrence probability of each word of the text training sentence in the text training set, comprises:
for each word of the text training sentence, accounting, a first number of a first target word sequence included in the text training set, a second number of a second target word sequence included in the text training set, and a third number of the word included in the text training set is accounted, wherein the first target word sequence is composed of the word and other two words before the word in the text training sentence, and the second target word sequence is composed of the word and another word before the word in the text training sentence;
calculating a first ratio of the first number to the second number corresponding to each word is calculated;
calculating a second ratio of the second number and the third number corresponding to each word of the text training sentence;
calculating a third ratio of the third number to a number of all words of the text training set;
determining a first smoothing coefficient of the first ratio, a second smoothing coefficient of the second ratio, and a third smoothing coefficient of the third ratio wherein a sum of the first smoothing coefficient and the second smoothing coefficient and the third smoothing coefficient is 1, and each of the first smoothing coefficient, the second smoothing coefficient, and the third smoothing coefficient is greater than or equal to 0;
for each word of the text training sentence, performing a weighted summation to the first ratio, the second ratio, and the third ratio based on the first smoothing coefficient, the second smoothing coefficient, and the third smoothing coefficient, to obtain the occurrence probability of each word of the text training sentence in the text training set.

6. The method of claim 1, further comprising:
determining an occurrence probability of each test sentence included in the text test set, based on the correspondence between each text training sentence in the statistical language model and the occurrence probability of the sentence corresponding to the text training sentence;
determining a word length of each test sentence of the text test set, wherein the word length represents the number of test words included in the corresponding text test sentence;

for each word length, determining the corresponding probability interval based on the occurrence probability of each test sentence corresponding to the word length, and establishing the corresponding relationship between the word length and the probability interval, thereby obtaining the mapping relationship between text length and probability.

7. An electronic device, comprising:
a processor; and
a storage medium coupled to the processor and storing instructions for execution by the processor, cause the processor to:
convert voice data into target text data based on a preset voice recognition model;
match keyword text data corresponding to a predetermined target voice keyword with the target text data to obtain a first matching result;
determine whether the voice data include the target voice keyword according to the first matching result, wherein if the first matching result indicates that the matching between the keyword text data and the target text data is successful, it is determined that the voice data include the target voice keyword;
wherein the processor is further caused to:
perform homophone expansion on the keyword text data to obtain at least one homophone text data, if the first matching result indicates that the matching between the keyword text data and the target text data is unsuccessful;
match each of the homophone text data with the target text data to obtain at least one second matching result;
segment the target text data into at least one segmentation text, if the at least one second matching result indicates that at least one homophone text data is successfully matched with the target text data;
extract the segmentation text that matches the homophone text data from the at least one segmentation text, and replace the homophone text data included in the segmentation text with the keyword text data to obtain a target segmentation text;
train a preset statistical language model by:
for each text training sentence included in the text training set, calculating a word occurrence probability of each word of the text training sentence in the text training set;
calculating a sentence occurrence probability of the text training sentence based on the word occurrence probability of each word;
obtaining the statistical language model based on the correspondence between each of the text training sentences and the sentence occurrence probability corresponding to the text training sentences;
calculate an occurrence probability of the target segmentation text based on the statistical language model, the occurrence probability of the target segmentation text referring to a frequency of occurrence of the target segmentation text in sentences of a text training set in a first target corpus for training the preset language model;
obtain a probability interval corresponding to a text length of the target segmentation text, according to the text length of the target segmentation text and a pre-established mapping relationship between text length and probability;
determine whether the occurrence probability is within the probability interval;

determine a probability that the target text data belongs to a plurality of preset text classifications based on a preset text classification model, and obtain a category vector of the target text data, if the occurrence probability is within the probability interval, wherein the text classification model is obtained by training based on a text corpus classification set including a plurality of text categories in a second target corpus;

calculate a correlation degree value between the keyword text data and each of the text categories, to obtain a correlation degree vector between the target keyword and the plurality of text categories;

perform a normalization processing to the correlation degree vector to obtain a normalized vector of the correlation degree vector;

calculate a cosine similarity between the category vector and the normalization vector, wherein the cosine similarity is determined as a category matching degree between the keyword text data and the target text data;

calculate a text data correlation degree between the keyword text data and the target text data based on the category matching degree and the occurrence probability; and determine whether the voice data includes the target voice keyword by determining whether the text data correlation degree is greater than a preset degree threshold, wherein the voice data includes the target voice keyword is determined if the text data correlation degree is greater than or equal to the preset degree threshold.

8. The electronic device of claim 7, wherein the processor is further caused to:

count a number of training texts included in the text corpus classification set to obtain a first text number;

for each text category, determine a number of training texts that belong to the text category and include the keyword text data, to obtain a second text number;

for each text category, determine a number of training texts that do not belong to the text classification and include the keyword text data, to obtain a third text number;

for each text category, determine a number of training texts that belong to the text category and do not include the keyword text data, to obtain a fourth text number;

for each text category, determine a number of training texts that does not belong to the text category and do not include the keyword text data, to obtain a fifth text number;

for each text category, calculate the correlation degree value between the text category and the keyword text data based on the first text number, the second text number, the third text number, the fourth text number, and the fifth text number corresponding to the text category.

9. The electronic device of claim 8, wherein the processor is further caused to:

calculate a product of the second text number and the fifth text number to obtain a first product;

calculate a product of the third text number and the fourth text number to obtain a second product;

calculate a square of the difference between the first product and the second product to obtain a square value;

calculate a product of the first text number and the square value to obtain a third Product;

calculate a sum of the second text number and the fourth text number to obtain a first sum value;

calculate a sum of the third text number and the fifth text number to obtain a second sum value;

calculate a sum of the second text number and the third text number to obtain a third sum value;

calculate a sum of the fourth text number and the fifth text number to obtain a fourth sum value;

calculate a product of the first sum value, the second sum value, the third sum value and the fourth sum value to obtain a fourth product;

calculate a quotient of the third product and the fourth product, wherein the quotient is determined as the correlation degree value between the text category and the keyword text data.

10. The electronic device of claim 7, wherein the processor is further caused to:

determine a first weight coefficient of the category matching degree and a second weight coefficient of the occurrence probability;

execute a weighted summation for the category matching degree and the occurrence probability based on the first weight coefficient and the second weight coefficient, to obtain the text data correlation degree between the keyword text data and the target text data;

wherein the sum of the first weight coefficient and the second weight coefficient is 1, and the first weight coefficient is greater than or equal to 0.2 and less than or equal to 0.8.

11. The electronic device of claim 7, wherein the processor is further caused to:

for each word of the text training sentence, account, a first number of a first target word sequence included in the text training set, a second number of a second target word sequence included in the text training set, and a third number of the word included in the text training set is accounted, wherein the first target word sequence is composed of the word and other two words before the word in the text training sentence, and the second target word sequence is composed of the word and another word before the word in the text training sentence;

calculate a first ratio of the first number to the second number corresponding to each word is calculated;

calculate a second ratio of the second number and the third number corresponding to each word of the text training sentence;

calculate a third ratio of the third number to a number of all words of the text training set;

determine a first smoothing coefficient of the first ratio, a second smoothing coefficient of the second ratio, and a third smoothing coefficient of the third ratio wherein a sum of the first smoothing coefficient and the second smoothing coefficient and the third smoothing coefficient is 1, and each of the first smoothing coefficient, the second smoothing coefficient, and the third smoothing coefficient is greater than or equal to 0;

for each word of the text training sentence, perform a weighted summation to the first ratio, the second ratio, and the third ratio based on the first smoothing coefficient, the second smoothing coefficient, and the third smoothing coefficient, to obtain the occurrence probability of each word of the text training sentence in the text training set.

12. A non-transitory storage medium having instructions stored herein, when the instructions are executed by a processor of an electronic device, the processor is configured to perform a voice data processing method based on deep learning, executable by an electronic device, the method comprising:

converting voice data into target text data based on a preset voice recognition model;

matching keyword text data corresponding to a predetermined target voice keyword with the target text data to obtain a first matching result;

determining whether the voice data include the target voice keyword according to the first matching result, wherein if the first matching result indicates that the matching between the keyword text data and the target text data is successful, it is determined that the voice data include the target voice keyword;

wherein the method further comprises:

performing homophone expansion on the keyword text data to obtain at least one homophone text data, if the first matching result indicates that the matching between the keyword text data and the target text data is unsuccessful;

matching each of the homophone text data with the target text data to obtain at least one second matching result;

segmenting the target text data into at least one segmentation text, if the at least one second matching result indicates that at least one homophone text data is successfully matched with the target text data;

extracting the segmentation text that matches the homophone text data from the at least one segmentation text, and replacing the homophone text data included in the segmentation text with the keyword text data to obtain a target segmentation text;

training a preset statistical language model by:

for each text training sentence included in the text training set, calculating a word occurrence probability of each word of the text training sentence in the text training set;

calculating a sentence occurrence probability of the text training sentence based on the word occurrence probability of each word;

obtaining the statistical language model based on the correspondence between each of the text training sentences and the sentence occurrence probability corresponding to the text training sentences;

calculating an occurrence probability of the target segmentation text based on the statistical language model, the occurrence probability of the target segmentation text referring to a frequency of occurrence of the target segmentation text in sentences of a text training set in a first target corpus for training the preset language model;

obtaining a probability interval corresponding to a text length of the target segmentation text, according to the text length of the target segmentation text and a pre-established mapping relationship between text length and probability;

determining whether the occurrence probability is within the probability interval;

determining a probability that the target text data belongs to a plurality of preset text classifications based on a preset text classification model, and obtaining a category vector of the target text data, if the occurrence probability is within the probability interval, wherein the text classification model is obtained by training based on a text corpus classification set including a plurality of text categories in a second target corpus;

calculating a correlation degree value between the keyword text data and each of the text categories, to obtain a correlation degree vector between the target keyword and the plurality of text categories;

performing a normalization processing to the correlation degree vector to obtain a normalized vector of the correlation degree vector;

calculating a cosine similarity between the category vector and the normalization vector, wherein the cosine similarity is determined as a category matching degree between the keyword text data and the target text data;

calculating a text data correlation degree between the keyword text data and the target text data based on the category matching degree and the occurrence probability;

determining whether the voice data includes the target voice keyword by determining whether the text data correlation degree is greater than a preset degree threshold, wherein the voice data includes the target voice keyword is determined if the text data correlation degree is greater than or equal to the preset degree threshold.

13. The non-transitory storage medium of claim 12, wherein a method of calculating a correlation degree value between the keyword text data and each of the text categories, comprises:

counting a number of training texts included in the text corpus classification set to obtain a first text number;

for each text category, determining a number of training texts that belong to the text category and include the keyword text data, to obtain a second text number;

for each text category, determining a number of training texts that do not belong to the text classification and include the keyword text data, to obtain a third text number;

for each text category, determining a number of training texts that belong to the text category and do not include the keyword text data, to obtain a fourth text number;

for each text category, determining a number of training texts that does not belong to the text category and do not include the keyword text data, to obtain a fifth text number;

for each text category, calculating the correlation degree value between the text category and the keyword text data based on the first text number, the second text number, the third text number, the fourth text number, and the fifth text number corresponding to the text category.

14. The non-transitory storage medium of claim 13, wherein a method of calculating the correlation degree value between the text category and the keyword text data based on the first text number, the second text number, the third text number, the fourth text number, and the fifth text number corresponding to the text category, comprises:

calculating a product of the second text number and the fifth text number to obtain a first product;

calculating a product of the third text number and the fourth text number to obtain a second product;

calculating a square of the difference between the first product and the second product to obtain a square value;

calculating a product of the first text number and the square value to obtain a third Product;

calculating a sum of the second text number and the fourth text number to obtain a first sum value;

calculating a sum of the third text number and the fifth text number to obtain a second sum value;

calculating a sum of the second text number and the third text number to obtain a third sum value;

calculating a sum of the fourth text number and the fifth text number to obtain a fourth sum value;

calculating a product of the first sum value, the second sum value, the third sum value and the fourth sum value to obtain a fourth product;

calculating a quotient of the third product and the fourth product, wherein the quotient is determined as the correlation degree value between the text category and the keyword text data.

15. The non-transitory storage medium of claim 12, wherein a method of calculating a text data correlation degree between the keyword text data and the target text data based on the category matching degree and the occurrence probability, comprises:

determining a first weight coefficient of the category matching degree and a second weight coefficient of the occurrence probability;

executing a weighted summation for the category matching degree and the occurrence probability based on the first weight coefficient and the second weight coefficient, to obtain the text data correlation degree between the keyword text data and the target text data;

wherein the sum of the first weight coefficient and the second weight coefficient is 1, and the first weight coefficient is greater than or equal to 0.2 and less than or equal to 0.8;

wherein a method of calculating a word occurrence probability of each word of the text training sentence in the text training set, comprises:

for each word of the text training sentence, accounting, a first number of a first target word sequence included in the text training set, a second number of a second target word sequence included in the text training set, and a third number of the word included in the text training set is accounted, wherein the first target word sequence is composed of the word and other two words before the word in the text training sentence, and the second target word sequence is composed of the word and another word before the word in the text training sentence;

calculating a first ratio of the first number to the second number corresponding to each word is calculated;

calculating a second ratio of the second number and the third number corresponding to each word of the text training sentence;

calculating a third ratio of the third number to a number of all words of the text training set;

determining a first smoothing coefficient of the first ratio, a second smoothing coefficient of the second ratio, and a third smoothing coefficient of the third ratio wherein a sum of the first smoothing coefficient and the second smoothing coefficient and the third smoothing coefficient is 1, and each of the first smoothing coefficient, the second smoothing coefficient, and the third smoothing coefficient is greater than or equal to 0;

for each word of the text training sentence, performing a weighted summation to the first ratio, the second ratio, and the third ratio based on the first smoothing coefficient, the second smoothing coefficient, and the third smoothing coefficient, to obtain the occurrence probability of each word of the text training sentence in the text training set.

* * * * *